UNITED STATES PATENT OFFICE.

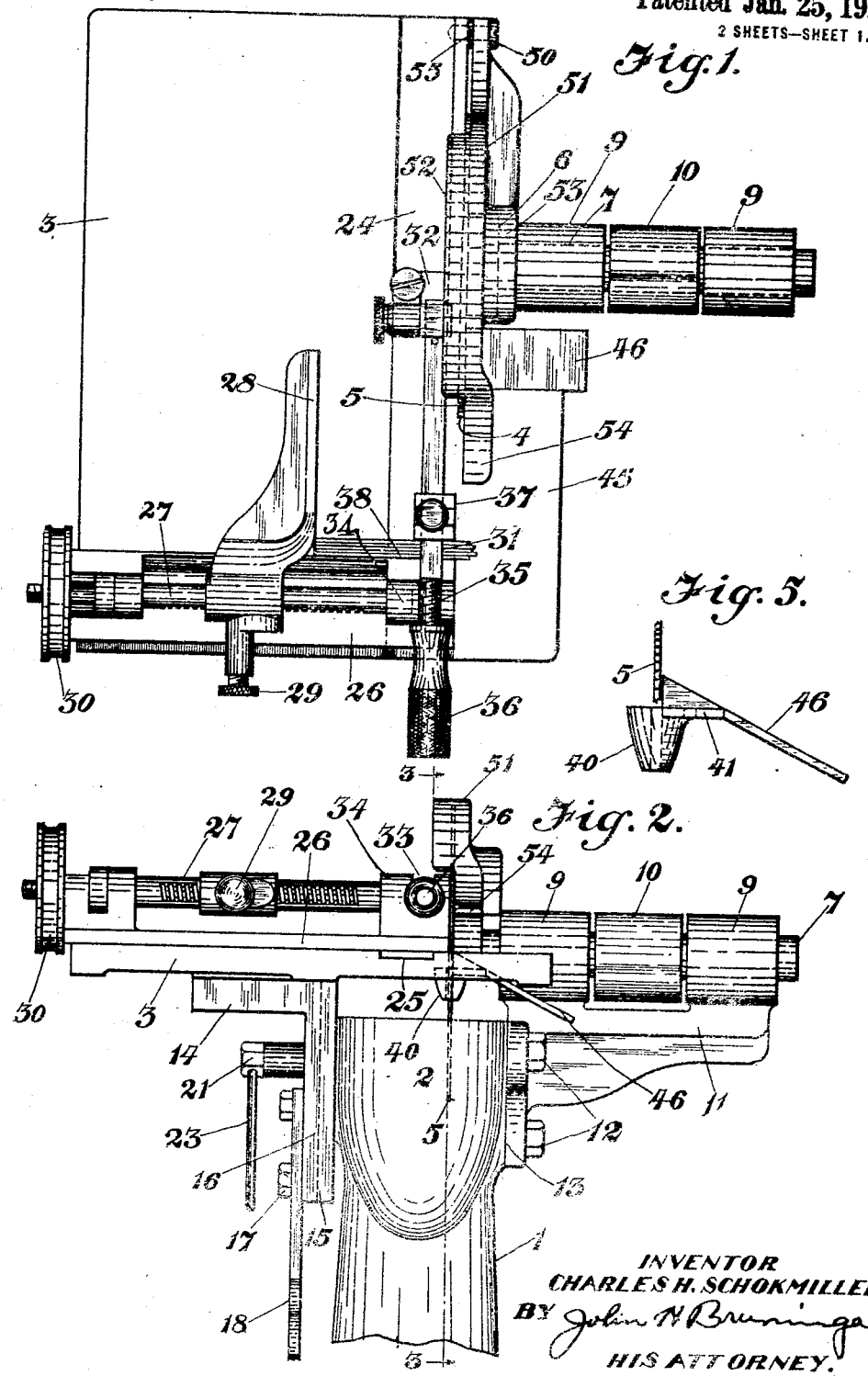

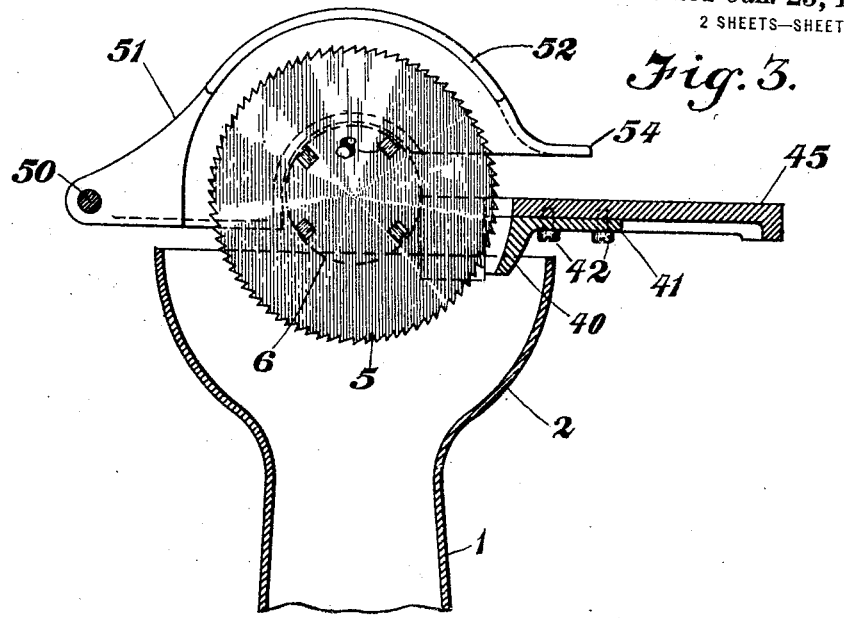

CHARLES H. SCHOKMILLER, OF ST. LOUIS, MISSOURI.

COMPOSING-ROOM SAW.

1,366,500.   Specification of Letters Patent.   Patented Jan. 25, 1921.

Application filed April 30, 1919. Serial No. 293,812.

*To all whom it may concern:*

Be it known that I, CHARLES H. SCHOKMILLER, a citizen of the United States, and residing at St. Louis, Missouri, have invented the new and useful Improvement in Composing-Room Saws, of which the following is a specification.

This invention relates to a composing room saw, which is generally used in composing rooms for cutting and trimming slugs.

In such a machine, a cutting element is provided which has teeth and trimming cutters, and which is usually mounted on a spindle in bearings attached to a base or support. Such bearings must be accurately alined in order to secure accurate trimming and cutting of the slugs. The chips removed by the tooth cutting element should be saved as the type metal employed is high priced and can be readily melted. In such a machine, the cuttings from the trimmed off ends of the slugs, frequently pile up on the table and prevent the continuous cutting of a considerable pile of slugs unless the operator removes these from the table during the cutting process; but this is not only inconvenient, but also endangers the operator. The cutting element revolves at very high speed and since the slugs to be cut are frequently short, there is danger of the operator's hand coming in contact with the saw, causing injury.

One of the objects of this invention, therefore, is to provide a composing room saw in which the cutting element has its spindle mounted in bearings in a bracket, and which is detachably mounted on the base so as to permit quick removal and replacement of the cutting element as a unit with said bracket.

Another object is to provide a chip guide which is so positioned with respect to the cutting edge of the cutting element as to direct the chips into the base and prevent them from flying off at an angle and become lost.

Another object is to provide a guide arranged laterally of but approximate the cutting element so as to direct the cuttings from that element.

Another object is to provide a guard for the cutting element which not only extends over the exposed periphery of the cutting element, but has a manipulative part which is arranged approximate the normal path of the work, so as to prevent contact of the hand of the operator with the cutting element.

Another object is to provide novel and simple mechanism for adjusting the work receiving table.

Another object is to provide a composing room saw which is simple in construction, effective in its operation, and cheap to manufacture.

Further objects will appear from the detail description taken in connection with the accompanying drawings, in which:

Figure 1 is a plan of a composing room saw embodying this invention;

Fig. 2 is a front elevation;

Fig. 3 is a section on the line 3—3, Fig. 2;

Fig. 4 is a detail side elevation showing the table carrier and its adjusting and clamping mechanism; and Fig. 5 is a detail side elevation showing the chip and cuttings guides.

Referring to the accompanying drawings, 1 designates a base in the form of a column which is hollow and is provided at its upper end with an expanded portion 2. Mounted on this base in the manner to be hereinafter described, is a table 3 which has a slot 4 adapted to receive a toothed cutting element or saw 5 mounted upon a head 6, in turn mounted upon a spindle 7. The head 6 is also provided with trimming cutters 8.

The spindle 7 is mounted in bearings 9 embracing a pulley 10 and formed on a block 11 secured by screws 12 to a machined side face 13 of the support or column 1.

The table 3 is mounted on a carrier 14 having a shank 15 provided with a groove 16 engaging a corresponding rib on the opposite side face of the base or column 1 and forming, therefor, a slide. The lower end of the slide is connected by a screw 17 with a lever 18 pivoted to a link 19 which is in turn pivoted at 20 on the base or column 1. A clamping screw 21 passes through a slot 22 in the slide or shank 15 has a reduced threaded portion engaging a tapped hole in the base 1 and is provided with an arm 23.

The table has a groove 24 which is engaged by a rib 25 on the slide 26 provided with a shank 27 carrying a gage 28, which is adjustable on the shank 27 and secured in adjusted position by a locking element 29; for fine adjustments, there is provided a wheel 30.

A bar 31 pivoted in a block 32 sliding in the groove 24, engages a recess 33 in a bearing lug 34 on the slide 26 and is provided with threads 35 engaged by a threaded sleeve 36. The bar 31 has adjustably mounted thereon a jaw 37 which coöperates with the face 38 of the slide 26 to clamp the work or slugs therebetween.

With the mechanism so far described, the operator in proceeding to trim a series of slugs will properly position the gage 28, properly position the jaw 37 on the bar 31 and by adjustment of the knurled sleeve 36 will clamp the slugs between the jaw 37 and the face 38 of the slide 26. The slide 26 is then moved forward on the table, thereby moving the work against the saw and trimming cutters and cutting and trimming the slugs. In order to position the table to the proper height, the clamping screw 21 is loosened by manipulation of the handle 23 and by then lowering the lever 18, the table can be lowered to the proper position and then clamped in adjusted position by manipulation of the handle 23.

In view of the fact that the table must be adjusted vertically, there must necessarily be a recess between the table and the top of the support or column as shown in Figs. 2 and 3; but then chips are liable to be thrown out through this recess instead of being deposited in the base, where they can be removed at the bottom through a suitable door.

In accordance with this invention, therefore, there is provided a guide 40 which projects downwardly below the table and is formed on a carrier 41 secured to the lower face of the table by screws 42. This guide is arranged adjacent the edge of the cutting element 4 and extends along its periphery so as to direct the chips into the base. It is, however, so constructed that it will move into the expanded part 2 when the table is adjusted for different heights. Accordingly, in all adjusted positions of the table, this guide will direct the chips into the base or column 1 so that these chips will not be wasted.

If the portion 45 of the table 3 were level, the cuttings to the right of the saw (Fig. 1) would pile up on the table and prevent the taking of a long cut and furthermore would somewhat interfere with the cutting operations of the saw or cutting element.

In accordance with this invention, therefore, a guide 46 is provided laterally of the saw and this guide inclines downwardly from the saw, as shown in Fig. 5, so that as the cuttings are thrown off from the ends of the slugs, they will drop on the guide 46 and slide downwardly so as to be out of the way. With the provision of such a guide, therefore, the cutting operation can proceed continuously irrespective of the number of slugs being cut at one time, as the cuttings are discarded as the trimming and cutting operation proceeds. In this particular embodiment, the inclined guide 46 is mounted on the base or carrier 41, which carries the chip guide.

Pivoted at the rear end of the table and on a screw 50 is a guard 51. This guard extends over the exposed periphery of the saw or cutting element 5, being provided with a lateral flange 52 for that purpose, but which flange terminates above the top of the bearing 34 so as not to interfere with the cutting operation. The guard furthermore has a side flange 53 which extends over the rotating head 6 and, therefore, prevents interference of the cuttings sliding down the guide 46. The guard has a forwardly extending lug 54 which extends laterally of the cutting edge of the saw, so as not to interfere with the slugs and which is spaced from the table only sufficient to prevent interference, but provides a guard so as to prevent contact of the hand of the operator with the revolving cutting element. This lug 54 also performs the function of a manipulative element whereby the guard may be swung on the pivot 50. In practice, the screw 50 is tightened so as to hold the guard frictionally in raised position, a spring washer 55 being provided for that purpose.

It will, therefore, be seen that this invention accomplishes its objects. In accordance with this invention, the cutting element has its spindle mounted in bearings on a bracket, which bracket is detachably mounted on the base, thereby permitting removal and replacement of the cutting element as a unit with the bracket. This is an advantageous construction, since it permits accurate alining of the spindle and permits the bearing for the spindle to be formed without the use of babbitt as the whole bracket may be readily replaced. The construction of the table and of the guard, together with the particular mounting of the bracket, permits the unit to be readily removed and replaced.

The adjustment of the table is such that any desired adjustment may be readily obtained. The provision of the chip and cuttings guides not only prevents wasting of the trimmed material, but also insures efficient operation. The provision of the guard renders its adjustment easy and quick, and prevents injury to the operator.

It is obvious that various changes may be made in the details of construction without departing from the spirit of this invention as pointed out in the appended claims; it is, therefore, to be understood that this invention is not to be limited to the specific construction shown and described.

Having thus described the invention, what is claimed is:

1. A composing room saw, comprising, a base, a table on said base, a cutting element, a spindle for said element, and a bracket having bearings for said spindle and detachably mounted on said base, adapted to permit removal and replacement of said element as a unit with said bracket and independently of other parts.

2. A composing room saw, comprising, a base, a table on said base, a cutting element extending through said table and into a recess in said base, a spindle for said element, and a bracket having bearings for said spindle and detachably mounted on said base, adapted to permit removal and replacement of said element as a unit with said bracket and independently of other parts.

3. A composing room saw, comprising, a base, a table on said base, means for adjusting said table on said base, a cutting element, a spindle for said element, and a bracket having bearings for said spindle and detachably mounted on said base, adapted to permit removal and replacement of said element as a unit with said bracket and independently of other parts.

4. A composing room saw, comprising, a base, a table on said base, a cutting element extending above said table, and a guide on said table arranged adjacent and extending laterally of said element from the upper surface of said table, adapted to direct the cuttings from said element.

5. A composing room saw, comprising, a base, a table on said base, a cutting element extending above said table, and a guide extending downwardly from and laterally of said element from the upper surface of said table, adapted to direct the cuttings from said element.

6. A composing room saw, comprising, a base, a table mounted for vertical adjustment on said base, a cutting element extending above said table, and a guide on and movable with said table arranged adjacent and extending laterally of said element, adapted to direct the cuttings from said element.

7. In a composing room saw, having a cutting element and a guard therefor, characterized by the feature that the guard is pivoted at its rear end and has at its forward end a manipulative part extending outwardly from said guard and arranged approximately the normal path of the work so as to prevent contact of the hand of the operator with the cutting element.

In testimony whereof I affix my signature this 21st day of April, 1919.

CHARLES H. SCHOKMILLER.